United States Patent
Fang et al.

(10) Patent No.: US 12,199,714 B2
(45) Date of Patent: Jan. 14, 2025

(54) COMMUNICATION SYSTEM AND COMMUNICATION METHOD USING RECONFIGURABLE INTELLIGENT SURFACE AND RECONFIGURABLE INTELLIGENT SURFACE DEVICE

(71) Applicant: Industrial Technology Research Institute, Hsinchu (TW)

(72) Inventors: Shih-Hao Fang, Hsinchu County (TW); Chiu-Ping Wu, Hsinchu County (TW); Hung-Fu Wei, Hsinchu (TW); Jen-Yuan Hsu, Kinmen County (TW)

(73) Assignee: Industrial Technology Research Institute, Hsinchu (TW)

( * ) Notice: Subject to any disclaimer, the term of this patent is extended or adjusted under 35 U.S.C. 154(b) by 76 days.

(21) Appl. No.: 18/085,527

(22) Filed: Dec. 20, 2022

(65) Prior Publication Data
US 2024/0171237 A1    May 23, 2024

(30) Foreign Application Priority Data
Nov. 22, 2022 (TW) .................................. 111144530

(51) Int. Cl.
*H04L 5/12* (2006.01)
*H04B 7/06* (2006.01)
*H04B 7/145* (2006.01)

(52) U.S. Cl.
CPC .......... *H04B 7/0617* (2013.01); *H04B 7/145* (2013.01)

(58) Field of Classification Search
CPC .............................. H04B 7/0617; H04B 7/145
(Continued)

(56) References Cited

U.S. PATENT DOCUMENTS

| 10,211,907 B1 | 2/2019 | Oroskar et al. |
| 2021/0075497 A1 | 3/2021 | Tekgul et al. |

(Continued)

FOREIGN PATENT DOCUMENTS

| CN | 107360108 | 11/2017 |
| CN | 111010219 | 11/2020 |

(Continued)

OTHER PUBLICATIONS

"Office Action of Taiwan Counterpart Application", issued on Oct. 6, 2023, p. 1-p. 5.
(Continued)

*Primary Examiner* — Zewdu A Kassa
(74) *Attorney, Agent, or Firm* — JCIPRNET

(57) ABSTRACT

An aspect of the disclosure includes a communication system and a communication method using reconfigurable intelligent surface and a reconfigurable intelligent surface device. The communication system includes at least one base station, a reconfigurable intelligent surface device, and a control at one least device. The at least one base station respectively transmits at least one beam. The reconfigurable intelligent surface device is coupled to the at least one base station, and measures the at least one beam of the at least one base station to obtain signal measurement results associated with each of the at least one base station. The control device is coupled to the at least one base station. The control device groups the at least one base station and the reconfigurable intelligent surface device into at least one group according to the signal measurement results associated with each of the at least one base station.

19 Claims, 14 Drawing Sheets

(58) Field of Classification Search
USPC ............. 375/262, 260, 259, 219, 295, 316
See application file for complete search history.

(56) References Cited

U.S. PATENT DOCUMENTS

| | | | |
|---|---|---|---|
| 2022/0052764 A1 | 2/2022 | Medra et al. | |
| 2024/0120967 A1* | 4/2024 | Elshafie | H04B 7/06952 |
| 2024/0146358 A1* | 5/2024 | Jung | H04B 7/0626 |

FOREIGN PATENT DOCUMENTS

| | | |
|---|---|---|
| CN | 112735111 | 4/2021 |
| CN | 113645171 | 11/2021 |
| CN | 113804961 | 12/2021 |
| CN | 114554520 | 5/2022 |
| TW | 202123644 | 6/2021 |
| WO | 2022000402 | 1/2022 |

OTHER PUBLICATIONS

Hamidreza Taghvaee et al., "Sustainable Multi-User Communication with Reconfigurable Intelligent Surfaces in 5G Wireless Networks and Beyond," 2022 16th European Conference on Antennas and Propagation (EuCAP), Apr. 2022, pp. 1-5.

Chongwen Huang et al., "Reconfigurable Intelligent Surfaces for Energy Efficiency in Wireless Communication," IEEE Transactions on Wireless Communications, vol. 18, Aug. 2019, pp. 4157-4170.

Ertugrul Basar et al., "Wireless Communications Through Reconfigurable Intelligent Surfaces," IEEE Access, vol. 7, Aug. 2019, pp. 116753-116773.

Chongwen Huang et al., "Reconfigurable Intelligent Surface Assisted Multiuser MISO Systems Exploiting Deep Reinforcement Learning," IEEE Journal on Selected Areas in Communications, vol. 38, Aug. 2020, pp. 1839-1850.

Ertugrul Basar, "Reconfigurable Intelligent Surface-Based Index Modulation: A New Beyond MIMO Paradigm for 6G," IEEE Transactions on Communications, vol. 68, May 2020, pp. 3187-3196.

Huayan Guo et al., "Weighted Sum-Rate Maximization for Reconfigurable Intelligent Surface Aided Wireless Networks," IEEE Transactions on Wireless Communications, vol. 19, May 2020, pp. 3064-3076.

* cited by examiner

COMMUNICATION SYSTEM AND COMMUNICATION METHOD USING RECONFIGURABLE INTELLIGENT SURFACE AND RECONFIGURABLE INTELLIGENT SURFACE DEVICE

CROSS-REFERENCE TO RELATED APPLICATION

This application claims the priority benefit of Taiwan application serial no. 111144530 filed on Nov. 22, 2022. The entirety of the above-mentioned patent application is hereby incorporated by reference herein and made a part of this specification.

TECHNICAL FIELD

The disclosure relates to a communication system and a communication method using a reconfigurable intelligent surface and a reconfigurable intelligent surface device.

BACKGROUND

With the evolution of mobile communication technology, the use of high-frequency signals for communication has become a very important trend. The use of high-frequency signals not only increases the available frequency band but also improves transmission efficiency. However, due to the short wavelength and small amplitude of the high-frequency signal, the signal coverage of the high-frequency signal is relatively small, and the penetration ability is relatively poor, so it is easily blocked by other obstacles. Specifically, when there is an obstacle between the base station and the terminal equipment, the terminal equipment may not be able to receive the high-frequency signal sent by the base station smoothly, which makes overcoming signal blocking and improving signal coverage the key issues to be solved in the next generation of communication technology.

In such a communication scenario, research on reconfigurable intelligent surface (RIS) technology has attracted extensive attention. A reconfigurable intelligent surface is proposed to effectively improve the signal coverage of the base station and improve the transmission performance of the terminal equipment. Specifically, the reconfigurable intelligent surface may reflect the received signal to the terminal equipment, so that the terminal equipment may receive the signal sent by the base station, thereby overcoming the problem of signal loss caused by obstacles. In particular, a reconfigurable intelligent surface made of electromagnetic materials may adjust the phase or amplitude of the incident signal to direct the reflected signal to a specific direction, thereby realizing the reconfiguration of the wireless transmission environment. However, the locations of the reconfigurable intelligent surface and the base station are generally fixed. Therefore, when the communication channel environment changes due to the movement of user equipment or obstacles, there are still many problems to be solved in the application of reconfigurable intelligent surfaces. How to apply the reconfigurable intelligent surface to the variable communication channel environment is an issue that those skilled in the art are concerned about.

SUMMARY

The disclosure relates to a communication system and a communication method using a reconfigurable intelligent surface and a reconfigurable intelligent surface device, which may determine the grouping configuration of base stations and RIS devices according to actual channel conditions to optimize system transmission performance.

An embodiment of the disclosure relates to a communication system using a reconfigurable intelligent surface, which includes at least one base station, an RIS device, and a control device. The at least one base station respectively transmits at least one beam. The RIS device is coupled to the at least one base station, and measures the at least one beam of the at least one base station to obtain signal measurement results associated with each base station. The control device is coupled to the at least one base station. The control device groups the at least one base station and the RIS device into at least one group according to the signal measurement results associated with each base station.

An embodiment of the disclosure relates to a communication method using a reconfigurable intelligent surface, including the following operation. At least one beam of the at least one base station are measured to obtain signal measurement results associated with each base station. The at least one base station and an RIS device are grouped into at least one group according to the signal measurement results associated with each base station.

An embodiment of the disclosure relates to a reconfigurable intelligent surface device, which includes a transceiver, a memory, and a processor. The processor is coupled to the transceiver and the memory, and is configured to perform the following operation. At least one beam of the at least one base station are measured to obtain signal measurement results associated with each base station. The signal measurement results associated with each base station are transmitted to the control device through the transceiver. The signal measurement result of each base station are used to determine the group to which the reconfigurable intelligent surface device belongs.

In order to make the aforementioned features of the disclosure comprehensible, embodiments accompanied with drawings are described in detail below.

BRIEF DESCRIPTION OF THE DRAWING

The accompanying drawings are included to provide a further understanding of the disclosure, and are incorporated in and constitute a part of this specification. The drawings illustrate embodiments of the disclosure, and together with the description serve to explain principles of the disclosure.

DETAILED DESCRIPTION OF DISCLOSED EMBODIMENTS

In order for the aforementioned features of the disclosure to be easily understand, the following describes in detail the exemplary embodiments with accompanying drawings. It is to be understood that both the foregoing general description and the following detailed description are exemplary and are intended to provide further explanation of the disclosure as claimed.

Figure 1:
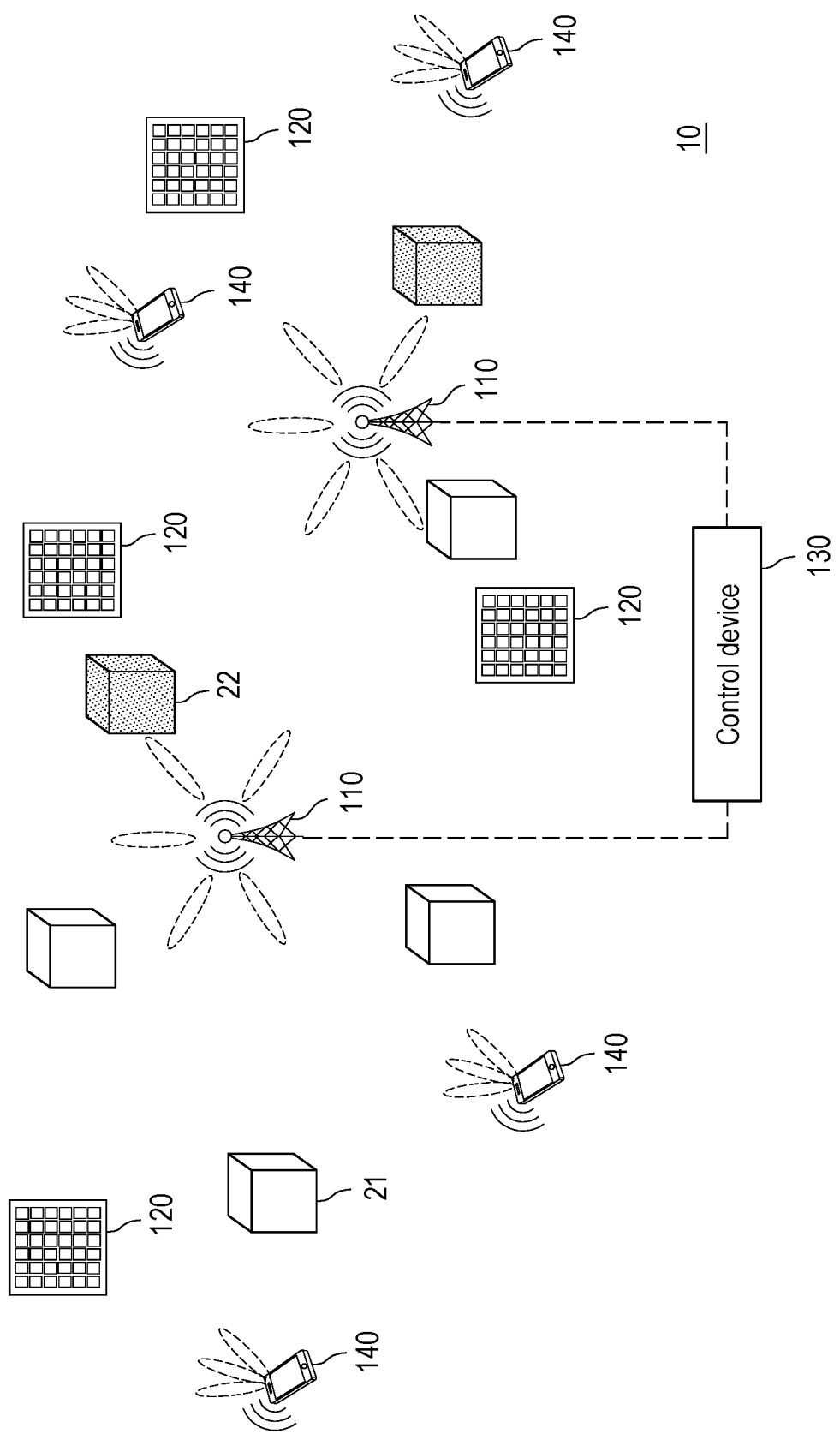
FIG. 1 is a schematic diagram of a communication system according to an exemplary embodiment of the disclosure.

FIG. 1 is a schematic diagram of a communication system according to an embodiment of the disclosure. Referring to FIG. 1, a communication system 10 includes but not limited to a base station (BS) 110, an RIS device 120, a control device 130, and a user equipment (UE) 140. It should be noted that although FIG. 1 shows two base stations 110, four RIS devices 120, and four user equipments 140, the number of base stations, the number of RIS devices, and the number of user equipment are not limited in this disclosure.

In the disclosed embodiment, the base station 110 is a device capable of communicating with the user equipment 140 through radio signals. The base station 110 may be, for example, a home evolved node B (HeNB), an evolved node B (eNB), a next generation node B (gNB), a base transceiver system (BTS), a repeater, an access point, a transponder, or a network equipment in the future evolution of the public land mobile network (PLMN).

In this disclosed embodiment, the user equipment 140 may be, for example, a mobile station, an advanced mobile station (AMS), a server, a client, a desktop computer, a notebook computer, a network computer, a workstation, a personal digital assistant (PDA), a tablet personal computer (PC), a scanner, a telephone device, a pager, a camera, a television, a handheld video game device, a music device, a wireless sensor, or an Internet of Things (IoT) device, etc. In some applications, the user equipment 140 may be a stationary computer device operating in a mobile environment such as a bus, train, airplane, boat, automobile, etc.

In this disclosed embodiment, the base station 110 may use new radio (NR), long term evolution (LTE), LTE-advanced (LTE-A), WiMAX, Wi-Fi, code division multiple access (CDMA), wireless local area network (WLAN), or other wireless communication technologies to communicate with each other or with the user equipment 14.

In the disclosed embodiment, the base station 110 may use beamforming technology to generate multiple beams. Beamforming technology is a technology that sends signals through multiple antennas so that the signals may be focused in a specific direction. The base station 110 may adjust the phase of the signal transmitted from each antenna to concentrate the signals transmitted from all the antennas in a specific direction to generate a directional beam. It should be noted that in FIG. 1, the existence of obstacles (such as obstacles 21 or 22, etc.) may block the signal sent by the base station 110 and create a communication dead zone, so that the user equipment 140 may not be able to directly receive the signal sent by the base station 110.

In the disclosed embodiment, the RIS device 120 may reflect the signal sent by the base station 110 to the user equipment 140, thus effectively improving the signal coverage of the base station 110. That is, the RIS device 120 may extend the signal coverage (e.g., beam coverage) of the base station 110 to areas that cannot be reached originally. In some embodiments, the RIS device 120 may be used as a passive equipment, and the reflection direction of the RIS device 120 may be controlled by the base station 110, the user equipment 140, or other control nodes. For example, the RIS device 120 may reflect the signal of the base station 110 to the user equipment 140 in the direction instructed by the base station 110.

Figure 2:
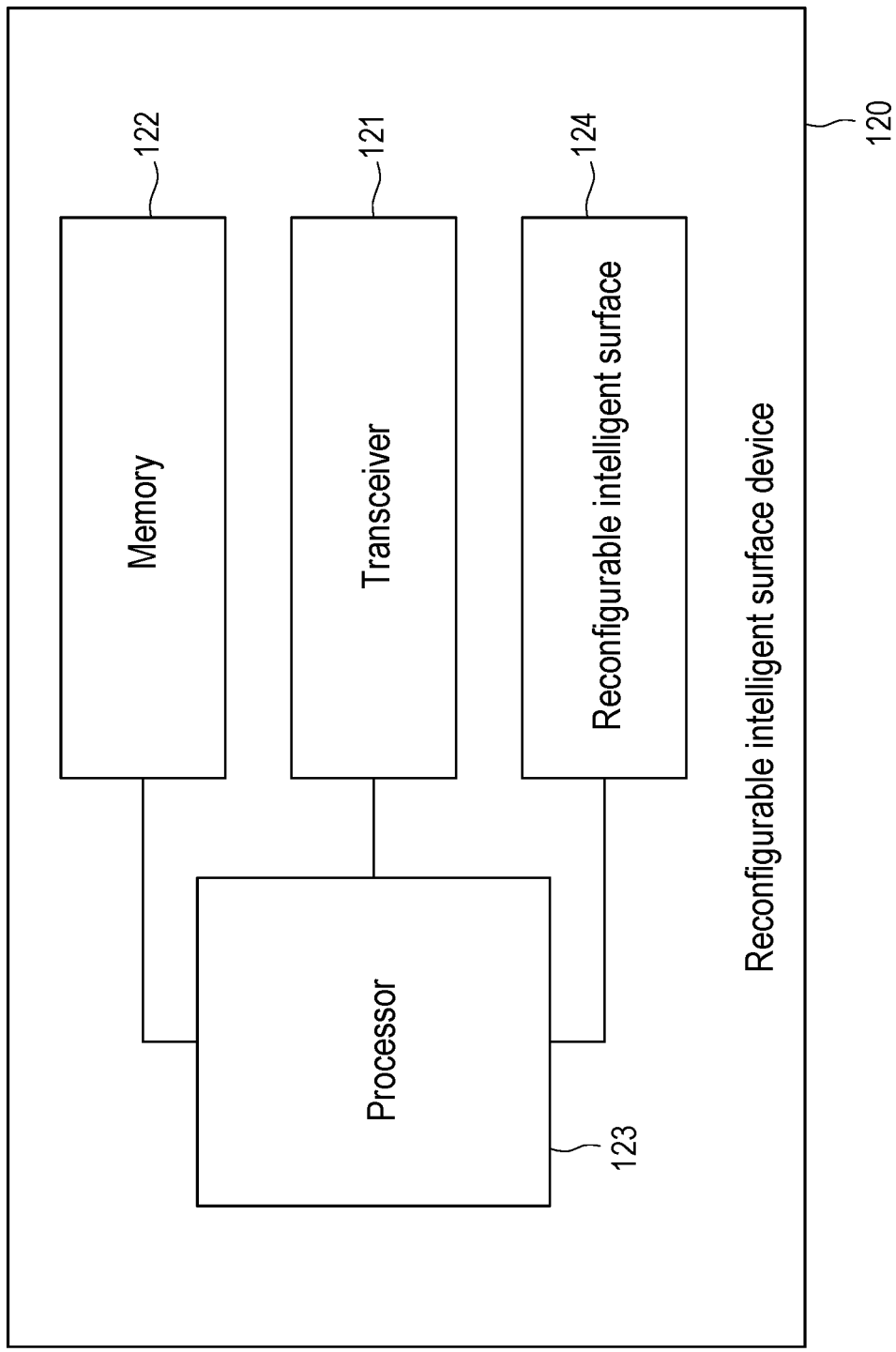
FIG. 2 is a block diagram of a reconfigurable intelligent surface device according to an exemplary embodiment of the disclosure.

Referring to FIG. 2, FIG. 2 is a block diagram of a reconfigurable intelligent surface device according to an exemplary embodiment of the disclosure. The RIS device 120 may include a transceiver 121, a memory 122, a processor 123, and a reconfigurable intelligent surface 124.

The transceiver 121 is coupled to the processor 123. The transceiver 121 may perform operations such as low noise amplification (LNA), impedance matching, frequency mixing, frequency up/down conversion, filtering, amplification, and/or the like. The transceiver 121 may communicate with the base station 110 through a wired transmission interface or a wireless transmission interface.

The memory 122 is coupled to the processor 123 and is, for example, any type of fixed or movable volatile memory or non-volatile memory, such as random access memory (RAM), read-only memory (ROM), flash memory, hard disk (HDD), solid state drive (SSD), other similar elements, or a combination thereof. The memory 122 stores multiple of commands, modules, or programs accessed by the processor 123 so that the processor 123 may execute one or more operations of the communication method described in this disclosure.

The processor 123 is, for example, a central processing unit (CPU), or other programmable general-purpose or special-purpose microprocessor, digital signal processor (DSP), programmable controller, application specific integrated circuit (ASIC), graphics processing unit (GPU), complex programmable logic device (CPLD), field programmable gate array (FPGA), or other similar elements, or a combination of the elements thereof. The processor 123 may access and execute commands, modules, or programs in the memory 122 to perform one or more operations of the communication method described in this disclosure.

The RIS 124 may include many RIS elements (also referred to as electronically controlled elements) distributed uniformly. The RIS elements of the RIS device 120 have reconfigurable electromagnetic properties. The disclosure does not limit the arrangement of the RIS elements, for example, the arrangement of the RIS elements is a matrix arrangement, a ring arrangement, or arranged in other shapes. Depending on the combination of element configuration states, the RIS 124 may reflect and modify incident radio waveforms in a controlled manner, such as changing the direction of the reflection or changing the beam width, etc. In some embodiments, the RIS elements of the RIS 124 may be controlled by the processor 123 according to the control information provided by the base station 110.

In an embodiment of the disclosure, the control device 130 is communicatively coupled to the base station 110, which may serve as a base station coordinator (BS coordinator). The control device 130 may be computing devices such as various types of servers, computer hosts, and workstations. From another point of view, the control device 130 may be an equipment in a core network or an equipment in a radio access network (RAN).

Figure 3:
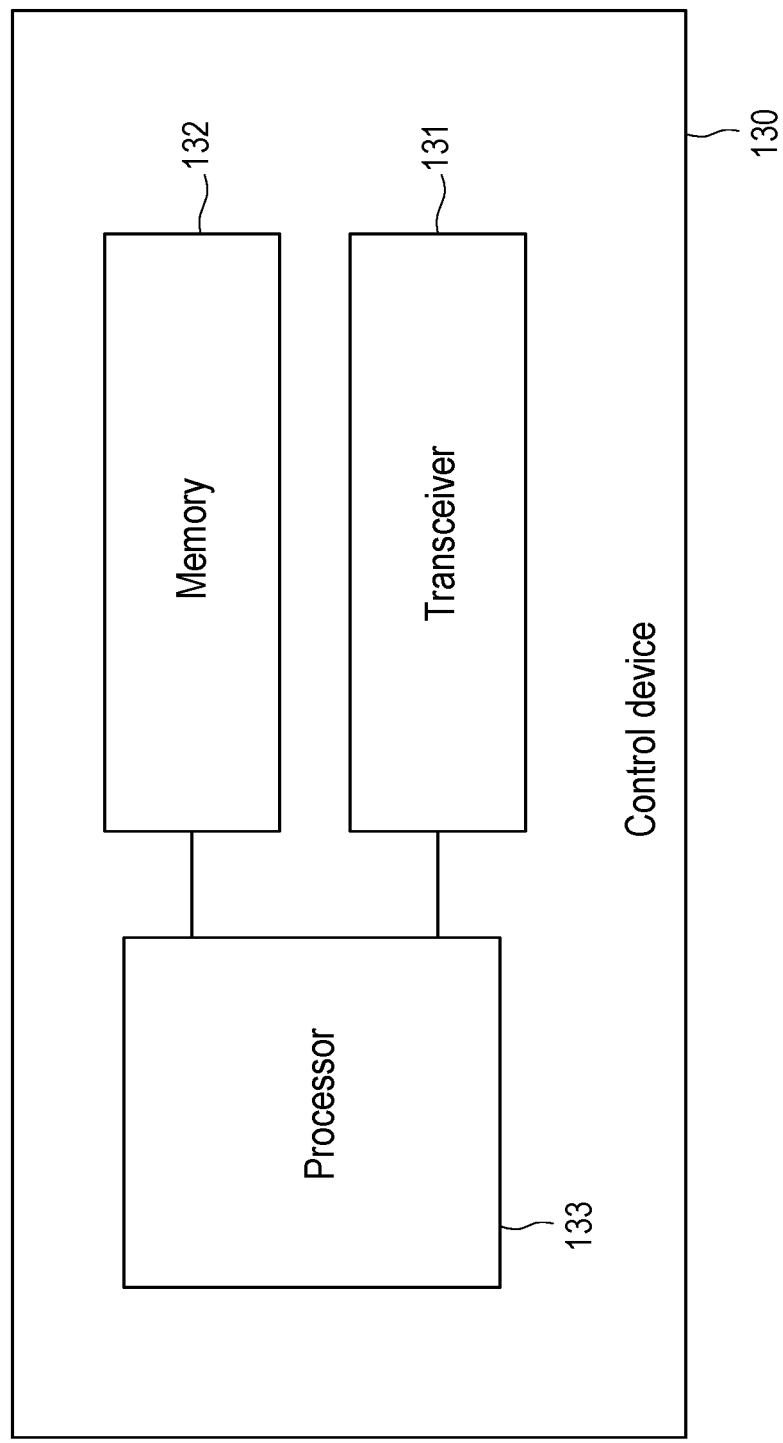
FIG. 3 is a block diagram of a control device according to an exemplary embodiment of the disclosure.

Referring to FIG. 3, FIG. 3 is a block diagram of a control device according to an exemplary embodiment of the disclosure. The control device 130 may include a transceiver 131, a memory 132, and a processor 133.

The transceiver 131 is coupled to the processor 133. The transceiver 131 may perform operations such as low noise amplification, impedance matching, frequency mixing, frequency up/down conversion, filtering, amplification, and/or the like. The transceiver 131 may communicate with the base station 110 through a wired transmission interface or a wireless transmission interface.

The memory 132 is coupled to the processor 133 and is, for example, any type of fixed or movable volatile memory or non-volatile memory, such as random access memory, read-only memory, flash memory, hard disk, solid state drive, other similar elements, or a combination thereof. The memory 132 stores multiple of commands, modules, or programs accessed by the processor 133 so that the processor 133 may execute one or more operations of the communication method described in this disclosure.

The processor 133 is, for example, a central processing unit, or other programmable general-purpose or special-purpose microprocessor, digital signal processor, programmable controller, application specific integrated circuit, graphics processing unit, complex programmable logic device, field programmable gate array, or other similar elements, or a combination of the elements thereof. The processor 133 may access and execute commands, modules, or programs in the memory 132 to perform one or more operations of the communication method described in this disclosure.

Figure 4:
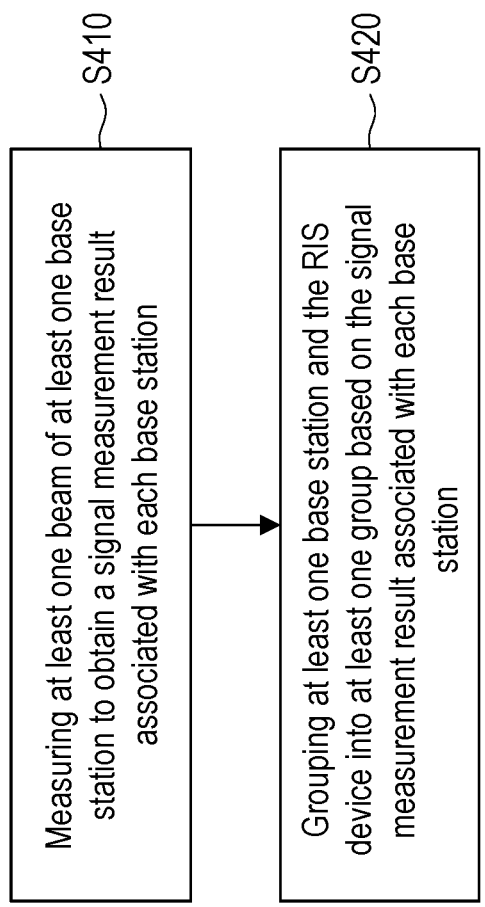
FIG. 4 is a flowchart of a communication method using a reconfigurable intelligent surface according to an exemplary embodiment of the disclosure.

FIG. 4 is a flowchart of a communication method using a reconfigurable intelligent surface according to an exemplary embodiment of the disclosure. Referring to FIG. 1 and FIG. 4, in step S410, the RIS device 120 or the user equipment 140 measures at least one beam of the base station 110 to obtain signal measurement results associated with each base station 110. In detail, the base station 110 may respectively transmit at least one beam. The RIS device 120 or the user equipment 140 may perform beam measurements on one or more beams of each base station 110. The RIS device 120 or the user equipment 140 may perform measurements on the reference signals sent by the base station 110 through different beams. For example, the aforementioned reference signal may include a synchronization signal (SS) or a channel state information reference signal (CSI-RS), etc. Afterwards, the RIS device 120 or the user equipment 140 may obtain the signal measurement results associated with each base station 110 according to the signal measurement results associated with each base station 110. In some embodiments, after performing beam measurements on one or more beams of a certain base station 110, the best beam of the base station 110 may be selected, and the signal measurement result of the best beam may be the signal measurement result of the base station 110.

In some embodiments, the signal measurement result may include received signal strength indicator (RSSI), reference signal received power (RSRP), reference signal received quality (RSRQ), or other signal strength indicators or parameters that may represent signal strength.

In step S420, the control device 130 may group at least one base station 110 and the RIS device 120 into at least one group according to the signal measurement results associated with each base station 110. In some embodiments, the RIS device 120 or the user equipment 140 may return the signal measurement results associated with each base station 110 to the control device 130 via the base station 110. By grouping base stations 110 and the RIS device 120 into one or more groups, the RIS device 120 may be assigned to assist one or more base stations 110 within the same group. That is, according to the grouping result based on the actual channel condition, the RIS device 120 may be assigned to reflect the beam signal sent by at least one of the one or more base stations 110 in the same group. It should be noted that the control device 130 may perform grouping operations on the base station 110 and the RIS device 120 regularly or irregularly. Based on this, the RIS device 120 may not only assist the appropriate base station 110 to improve the signal coverage, the base station 110 assisted by the RIS device 120 may also make adaptive adjustments in response to changes in the actual communication environment.

Figure 5:
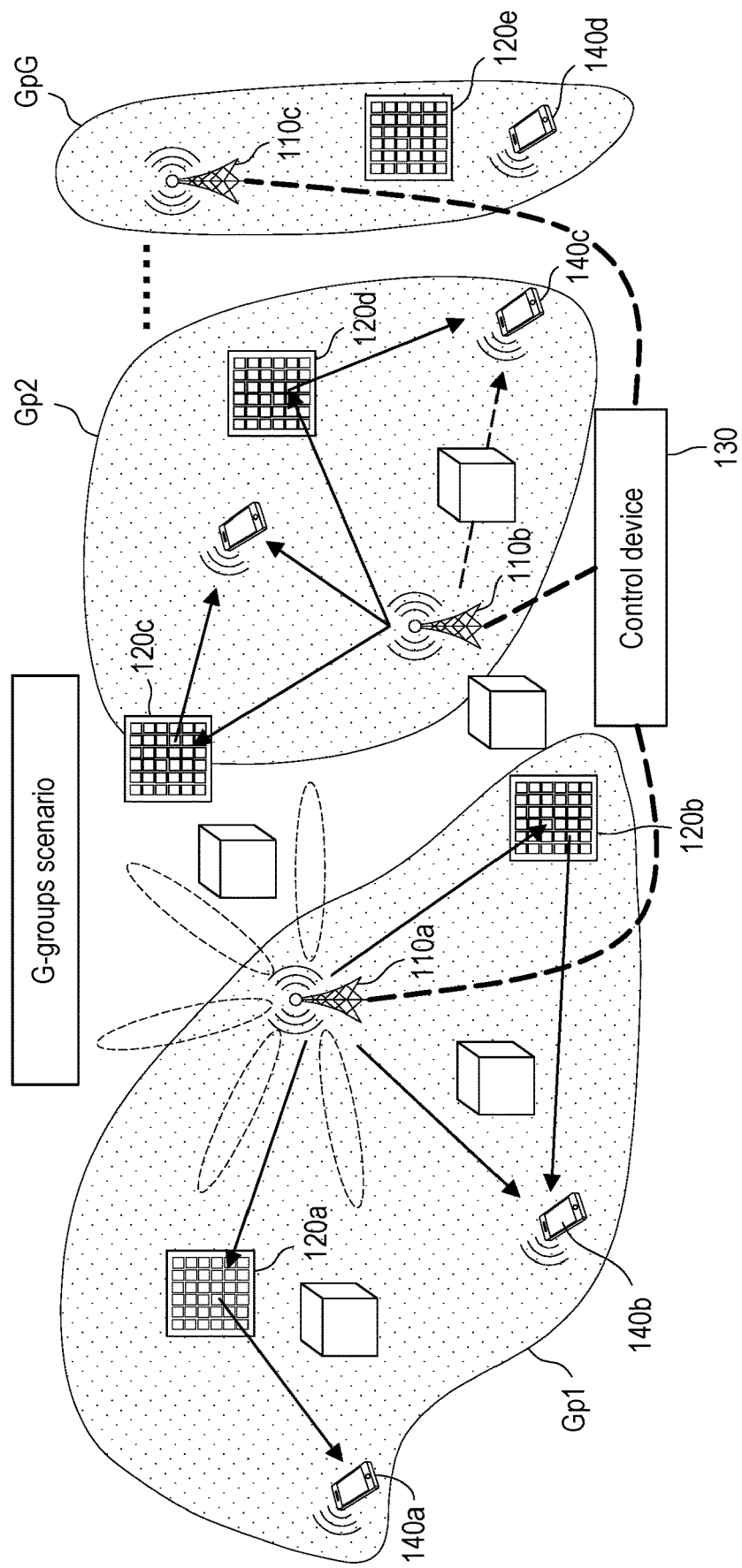
FIG. 5 is a diagram illustrating grouping base stations and the RIS device into at least one group according to an exemplary embodiment of the disclosure.

Referring to FIG. 5, FIG. 5 is a diagram illustrating grouping base stations and the RIS device into at least one group according to an exemplary embodiment of the disclosure. The control device 130 may perform grouping operations on multiple base stations and multiple RIS devices according to the signal measurement result of the base stations. Then, the control device 130 may transmit the group configuration information to these base stations, so that these base stations may control the corresponding RIS devices according to the group configuration information. As shown in FIG. 5, the control device 130 may group multiple base stations (e.g., base stations 110a, 110b, and 110c) and multiple RIS devices (e.g., RIS devices 120a, 120b, 120c, 120d, and 120e) into G groups.

The group Gp1 includes the base station 110a, the RIS device 120a, and the RIS device 120b. The RIS device 120a and the RIS device 120b may reflect the signal of the base station according to the control signal provided by the base station 110a. Therefore, the RIS device 120a and the RIS device 120b may be used to reflect the signal sent by the base station 110a, so that the user equipment 140a and the user equipment 140b may respectively receive the transmission signal of the base station 110a through the RIS device 120a and the RIS device 120b. Similarly, the group Gp2 includes the base station 110b, the RIS device 120c, and the RIS device 120d. The RIS device 120c and the RIS device 120d may reflect the signal of the base station 110b according to the control signal provided by the base station 110b. Therefore, the RIS device 120c and the RIS device 120d may be used to reflect the signal sent by the base station 110b, so that the user equipment 140c and the user equipment 140d may respectively receive the transmission signal of the base station 110b through the RIS device 120c and the RIS device 120d. In addition, the group GpG includes the base station 110c and the RIS device 120e. The RIS device 120e is used to reflect the signal sent by the base station 110c.

Figure 6:
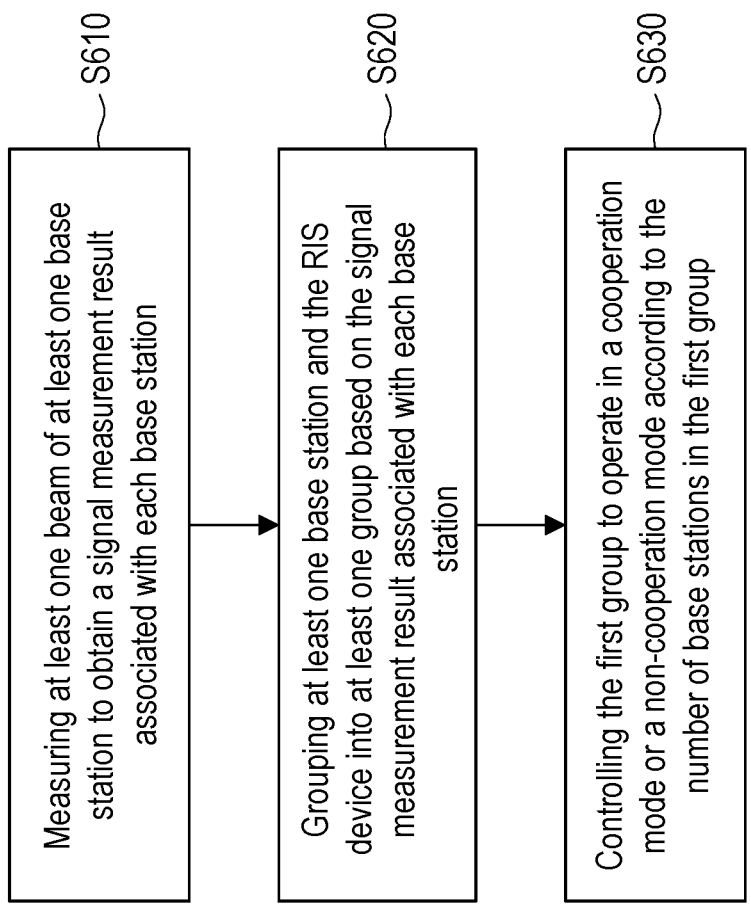
FIG. 6 is a flowchart of a communication method using a reconfigurable intelligent surface according to an exemplary embodiment of the disclosure.

FIG. 6 is a flowchart of a communication method using a reconfigurable intelligent surface according to an exemplary embodiment of the disclosure. Referring to FIG. 1 and FIG. 6, in step S610, the RIS device 120 or the user equipment 140 measures at least one beam of at least one base station 110 to obtain signal measurement results associated with each base station 110. In some embodiments, the RIS device 120 may measure at least one beam of the first base station to obtain signal measurement parameters of each beam of the first base station. Then, the RIS device 120 may determine the signal measurement result associated with the first base station according to the signal measurement parameters of each beam of the first base station. Specifically, the RIS device 120 may determine a best beam associated with the first base station according to the signal measurement parameters of each beam of the first base station. Afterwards, the RIS device 120 may configure the signal measurement parameters corresponding to the best beam as the signal measurement results associated with the first base station.

In some embodiments, beam identification information (e.g., the beam ID) may be carried on the measured signal, so that the measurement terminal (e.g., the RIS device 120 or the user equipment 140) may know which beam of the base station 110 is currently being measured. Alternatively, in some embodiments, the beam scheduling information of the base station 110 may be provided to the measurement terminal, so that the measurement terminal may know which beam of the base station 110 is currently being measured.

Figure 7:
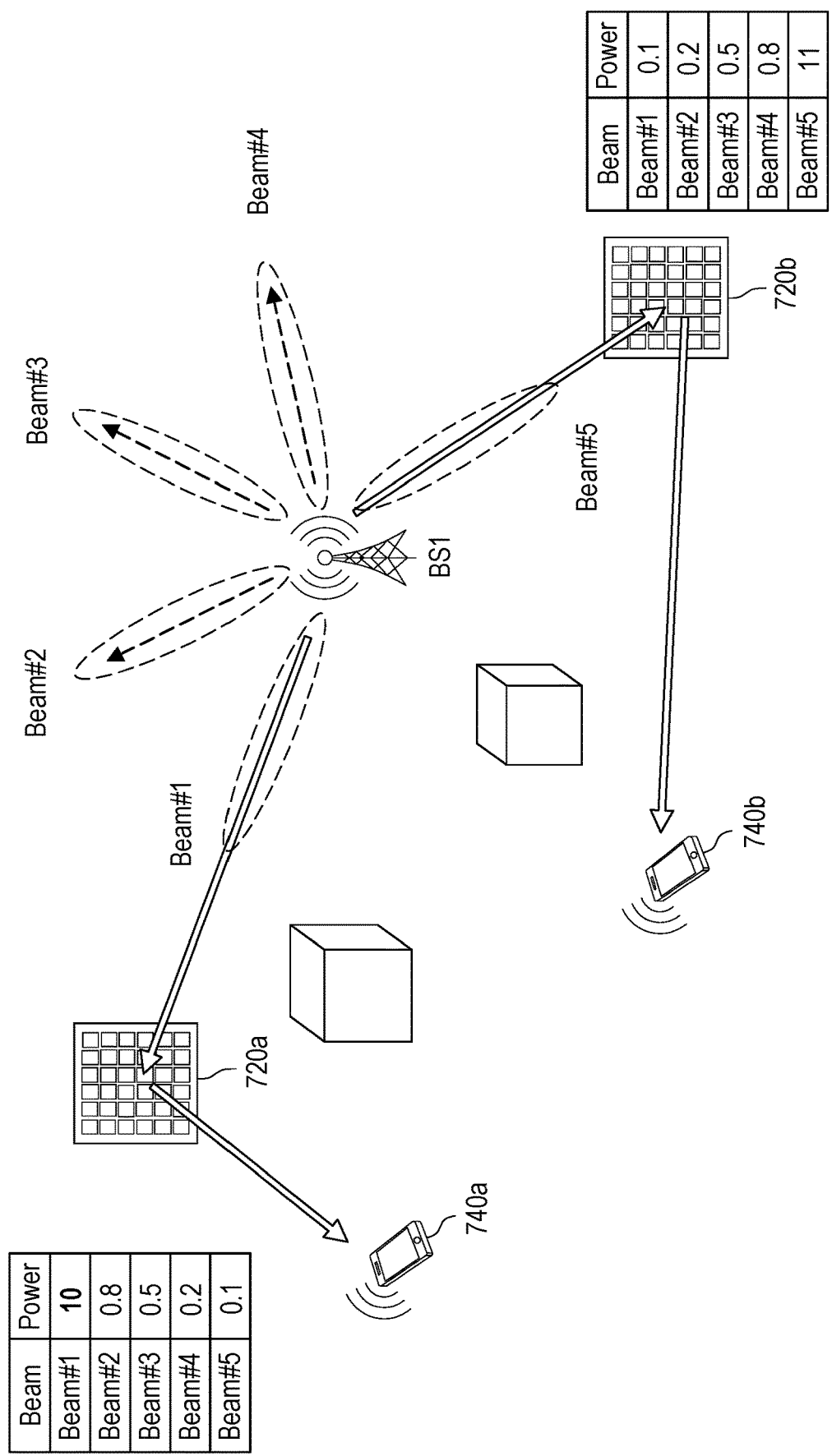
FIG. 7 is a schematic diagram illustrating best beam measurement of a base station according to an exemplary embodiment of the disclosure.

Referring to FIG. 7, FIG. 7 is a schematic diagram illustrating best beam measurement of a base station according to an exemplary embodiment of the disclosure. In the embodiment in FIG. 7, for the convenience of description, the signal measurement result and the signal measurement parameter are respectively taken as the received signal power, and the first base station BS1 generating 5 beams is taken as an example for description, but the disclosure is not limited thereto. In addition, all numerical values shown in FIG. 7 are for exemplary description only.

The first base station BS1 may generate five beams #1 to #5 in different directions. The RIS device 720a may measure the five beams #1 to #5 of the first base station BS1, and respectively obtain the received signal power corresponding to the five beams #1 to #5. As shown in FIG. 5, the RIS device 720a may measure that the received signal power of the beam #1 of the first base station BS1 is 10. The RIS device 720a may measure that the received signal power of the beam #2 of the first base station BS1 is 0.8, and so on. Since the received signal power of the beam #1 is greater than that of the other beams #2 to #5, the beam #1 of the first base station BS1 is the best beam of the first base station BS1 for the RIS device 720a. Therefore, the RIS device 720a may set the received signal power of the beam #1 as the signal measurement result of the first base station BS1. Based on similar operations, the RIS device 720a may also perform beam measurement for other base stations, and obtain signal measurement results of other base stations according to the best beams of other base stations. For example, after the RIS device 720a performs beam measurement on 5 base stations, the RIS device 720a may respectively obtain 5 signal measurement results corresponding to the 5 base stations.

On the other hand, the RIS device 720b may measure the five beams #1 to #5 of the first base station BS1, and respectively obtain the received signal power corresponding to the five beams #1 to #5. Since the received signal power of the beam #5 is greater than that of the other beams #1 to #4, the beam #5 of the first base station BS1 is the best beam of the first base station BS1 for the RIS device 720b. Therefore, the RIS device 720b may set the received signal power of the beam #5 as the signal measurement result of the first base station BS1. Based on similar operations, the RIS device 720b may also perform beam measurement for other base stations, and obtain signal measurement results of other base stations according to the best beams of other base stations.

It should be noted that FIG. 7 is illustrated by taking beam measurement performed by the RIS device 720a and the RIS device 720b as an example. However, in other embodiments, the user equipment 740a and 740b may also respectively obtain the signal measurement results of the first base station BS1 according to similar operations. The difference is that compared with the RIS device 720a and the RIS device 720b which directly measure the base station signal sent by the first base station BS1, the user equipment 740a and 740b measure the base station signals reflected by the RIS device 720a and the RIS device 720b.

Returning to FIG. 6, in step S620, the control device 130 may group at least one base station 110 and the RIS device 120 into at least one group according to the signal measurement results associated with each base station 110. Specifically, the control device 130 may collect signal measurement results from one or more base stations 110 provided by at least one measurement terminal (the RIS device 120 or the user equipment 140), and the base stations 110 and the RIS device 120 are grouped into at least one group according to the signal measurement results of one or more base stations 110 provided by each measurement terminal. That is, the signal measurement results of each base station provided by the RIS device 120 may be used to determine the group to which the RIS device 120 belongs.

In some embodiments, the base station 110 may include a first base station. In response to the signal measurement result of the first base station being greater than a threshold value, the control device 130 groups the RIS device 120 and the first base station into one of the at least one group. That is, when the signal measurement result of the first base station provided by the RIS device 120 is greater than a threshold value, the control device 130 may group the RIS device 120 and the first base station into the same group. The aforementioned threshold value may be designed according to the actual application, which is not limited in this disclosure.

In some embodiments, the base station 110 may include a first base station and a second base station. In response to the signal measurement result of the first base station being greater than the threshold value and the signal measurement result of the second base station being greater than the threshold value, the control device 130 groups the RIS device 120, the first base station, and the second base station into one of the at least one group. That is, when the signal measurement result of the first base station and the signal measurement result of the second base station provided by the RIS device 120 are both greater than the threshold value, the control device 130 may group the RIS device 120, the first base station, and the second base station into the same group.

In step S630, the control device 130 controls the first group to operate in a cooperation mode or a non-cooperation mode according to the number of base stations in the first group. In detail, each of the at least one group determined by the control device 130 may include one or more base stations 110. The control device 130 may determine whether the transmission configuration of each group is a cooperation mode or a non-cooperation mode according to the number of base stations in each group.

In some embodiments, when the number of base stations in the first group is greater than 1, the control device 130 controls the first group to operate in a cooperation mode.

That is, when the first group operates in the cooperation mode, the control device 130 may control the multiple base stations 110 in the first group to jointly communicate with the same user equipment 140. In some embodiments, when the first group operates in the cooperation mode, the control device 130 may control the multiple first base stations in the first group to jointly transmit downlink data to the user equipment 140. For example, when the first group operates in the cooperation mode, the control device 130 may control the multiple base stations 110 in the first group to communicate with the same user equipment 140 through a coordinate multi-point (CoMP) mechanism. On the other hand, when the number of base stations in the first group is equal to 1, the control device 130 controls the first group to operate in a non-cooperation mode. That is, when the first group operates in the non-cooperation mode, the control device 130 may control a single base station 110 in the first group to independently communicate with one or more user equipment 140.

Figure 8A:
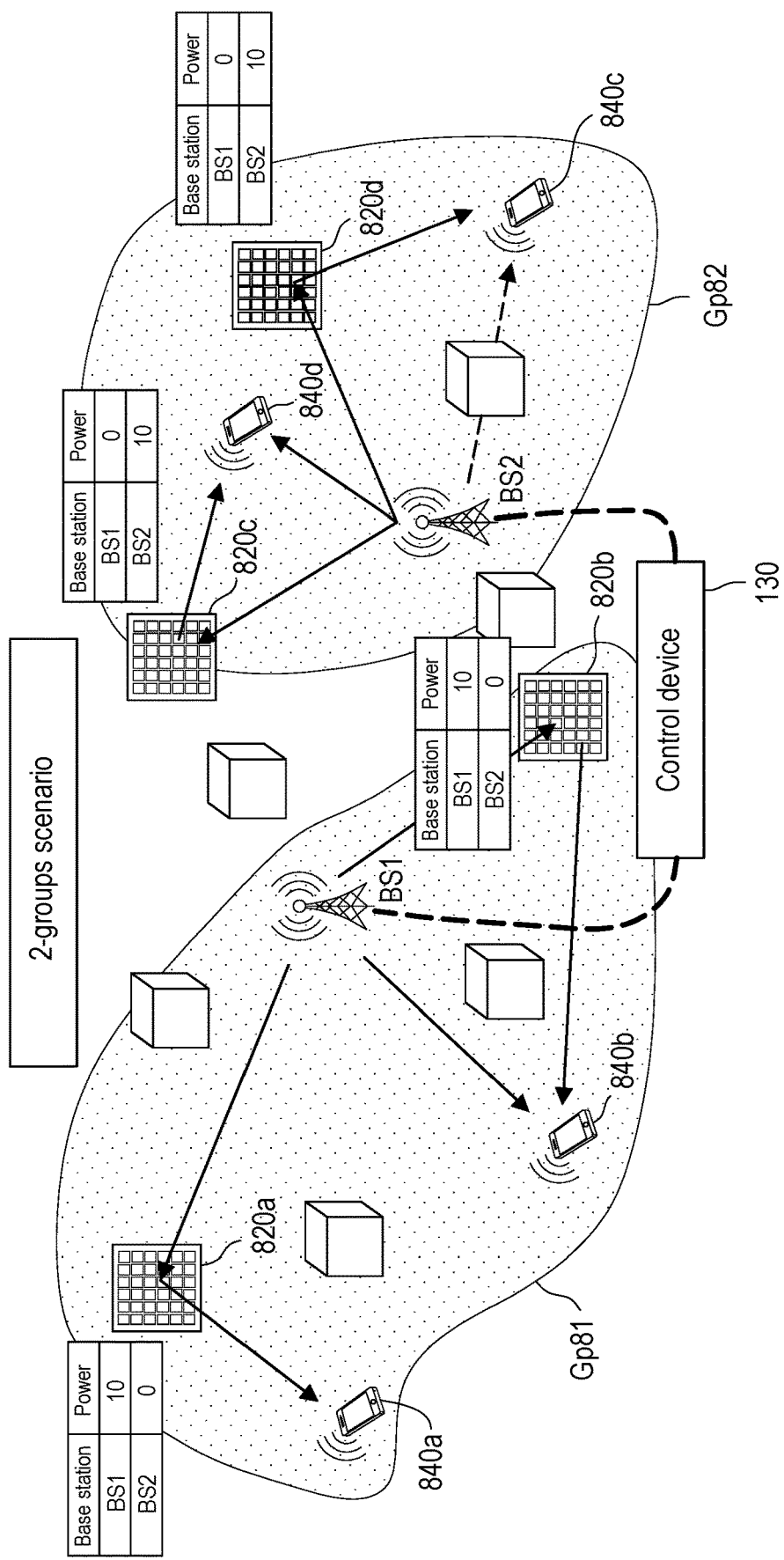
FIG. 8A is a schematic diagram illustrating a group operating in a non-cooperation mode according to an exemplary embodiment of the disclosure.

Referring to FIG. 8A, FIG. 8A is a schematic diagram illustrating a group operating in a non-cooperation mode according to an exemplary embodiment of the disclosure. All numerical values shown in FIG. 8A are for exemplary description only. After the RIS device 820a respectively performs beam measurement on the first base station BS1 and the second base station BS2, the RIS device 820a may respectively obtain signal measurement results associated with the first base station BS1 and the second base station BS2, that is, the received signal power "10" associated with the first base station BS1 and the received signal power "0" associated with the second base station BS2. Since the signal measurement result associated with the first base station BS1 generated by the RIS device 820a is greater than the threshold value, the control device 130 may group the RIS device 820a and the first base station BS1 into a first group Gp81.

Similarly, in FIG. 8A, since the signal measurement result associated with the first base station BS1 generated by the RIS device 820b is greater than the threshold value, the control device 130 may group the RIS device 820b and the first base station BS1 into the first group Gp81. That is, the first group Gp81 includes the first base station BS1, the RIS device 820a, and the RIS device 820b. Based on similar principles and operations, the control device 130 may group the second base station BS2, the RIS device 820c, and the RIS device 820d into a second group Gp82.

Afterwards, the control device 130 determines that the number of base stations in the first group Gp81 is equal to 1, and thus controls the first group Gp81 to operate in a non-cooperation mode. In this case, the first base station BS1 independently communicates with the user equipment 840a and 840b with the assistance of the RIS device 820a and the RIS device 820b. Similarly, the control device 130 determines that the number of base stations in the second group Gp82 is equal to 1, and thus controls the second group Gp82 to operate in a non-cooperation mode. The second base station BS2 also independently communicates with the user equipment 840c and 840d with the assistance of the RIS device 820c and the RIS device 820d. The first base station BS1 and the second base station BS2 may operate in a cooperation mode or a non-cooperation mode according to a control signal from the control device 130.

Figure 8B:
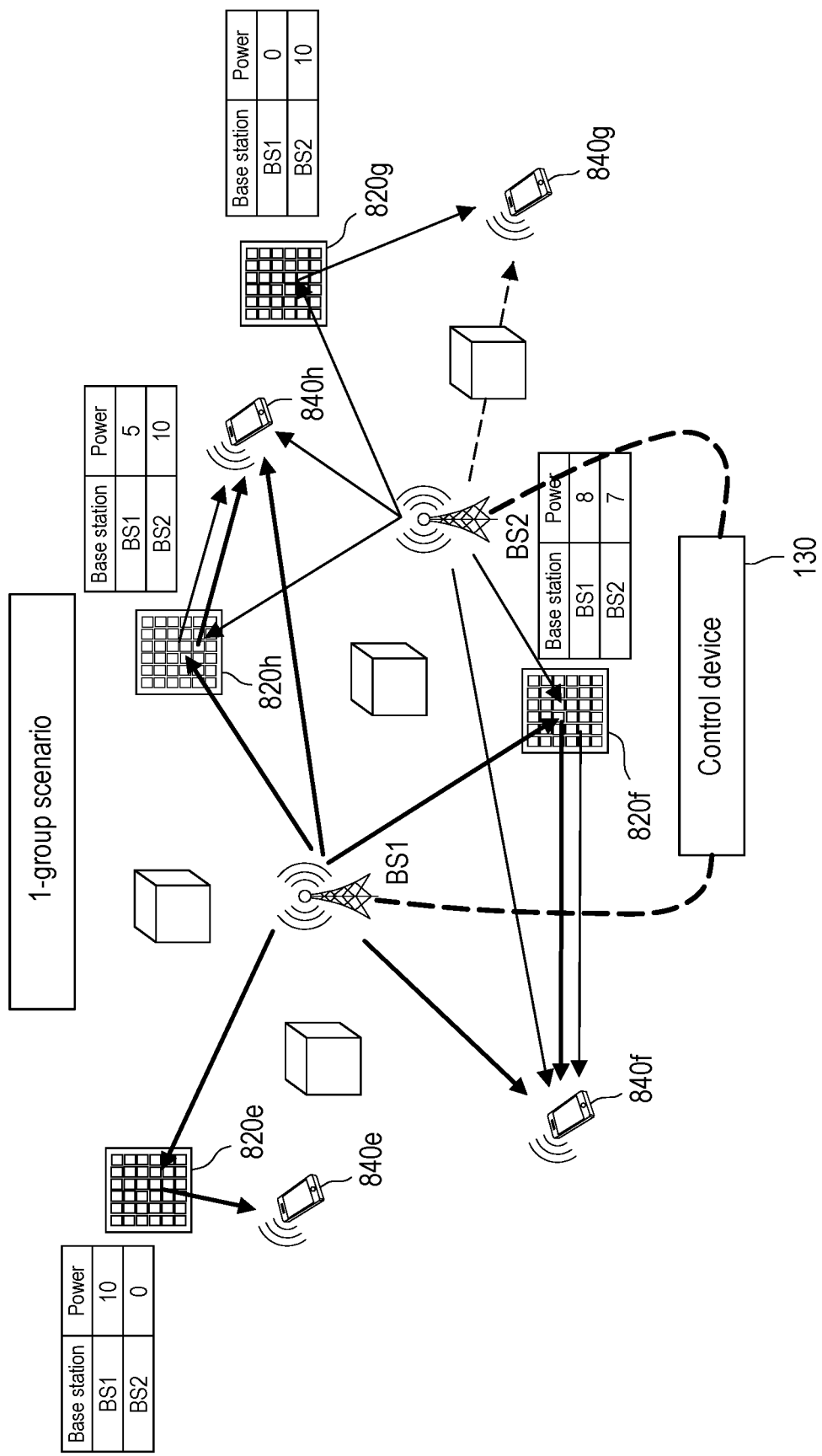
FIG. 8B is a schematic diagram illustrating a group operating in a cooperation mode according to an exemplary embodiment of the disclosure.

Referring to FIG. 8B, FIG. 8B is a schematic diagram illustrating a group operating in a cooperation mode according to an exemplary embodiment of the disclosure. All numerical values shown in FIG. 8B are for exemplary description only. After the RIS device 820f respectively performs beam measurement on the first base station BS1 and the second base station BS2, the RIS device 820f may respectively obtain signal measurement results associated with the first base station BS1 and the second base station BS2, that is, the received signal power "8" associated with the first base station BS1 and the received signal power "7" associated with the second base station BS2. Since both the signal measurement result associated with the first base station BS1 and the signal measurement result associated with the second base station BS2 generated by the RIS device 820f are greater than the threshold value, the control device 130 may group the RIS device 820f, the first base station BS1, and the second base station BS2 into the same group.

Similarly, in FIG. 8B, since both the signal measurement result associated with the first base station BS1 and the signal measurement result associated with the second base station BS2 generated by the RIS device 820h are greater than the threshold value, the control device 130 may group the RIS device 820h, the first base station BS1, and the second base station BS2 into the same group.

In addition, based on the signal measurement result associated with the first base station BS1 generated by the RIS device 820e being greater than the threshold value, the control device 130 may group the RIS device 820e and the first base station BS1 into the same group. Similarly, based on the signal measurement result associated with the second base station BS2 generated by the RIS device 820g being greater than the threshold value, the control device 130 may group the RIS device 820g and the second base station BS2 into the same group. In this case, the first base station BS1, the second base station BS2, the RIS device 820e, the RIS device 820f, the RIS device 820g, and the RIS device 820h are all grouped into the same group by the control device 130.

Afterwards, the control device 130 determines that the number of base stations in the first group is greater than 1, and thus controls the first group to operate in the cooperation mode. In this case, the first base station BS1 and the second base station BS2 may jointly transmit downlink data to the user equipment 840f through the RIS device 820f. The first base station BS1 and the second base station BS2 may jointly transmit downlink data to the user equipment 840h through the RIS device 820h.

Figure 9A:
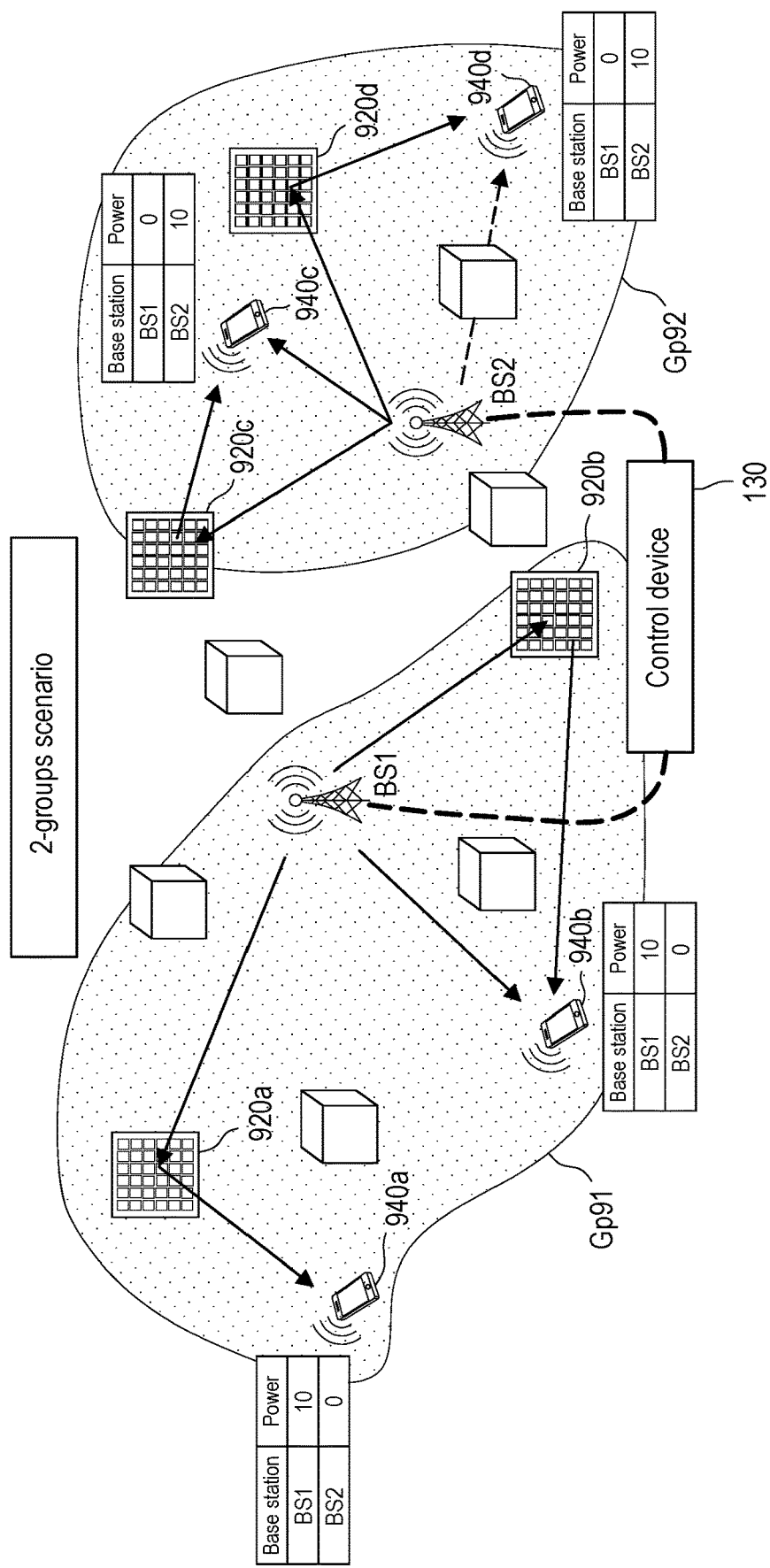
FIG. 9A is a schematic diagram illustrating a group operating in a non-cooperation mode according to an exemplary embodiment of the disclosure.

Referring to FIG. 9A, FIG. 9A is a schematic diagram illustrating a group operating in a non-cooperation mode according to an exemplary embodiment of the disclosure. All numerical values shown in FIG. 9A are for exemplary description only. Compared with the example shown in FIG. 8A, the example shown in FIG. 9A uses the user equipment 940a, 940b, 940c, and 940d to measure beams generated by the first base station BS1 and the second base station BS2. In particular, the user equipment 940a, 940b, 940c, and 940d may measure the reference signal reflected by the RIS device 920a, 920b, 920c, and 920d.

In detail, after the user equipment 940a respectively performs beam measurement on the first base station BS1 and the second base station BS2, the user equipment 940a may obtain signal measurement results respectively associated with the first base station BS1 and the second base station BS2, that is, the received signal power "10" associated with the first base station BS1 and the received signal power "0" associated with the second base station BS2. It should be noted that, by measuring the reference signal reflected by the RIS device 920a, the user equipment 940a may obtain a signal measurement result corresponding to at least one beam of the first base station BS1. Similarly, by measuring the reference signal reflected by the RIS device 920b, the user equipment 940b may obtain a signal measurement result corresponding to at least one beam of the first base station BS1.

In FIG. 9A, since the signal measurement result associated with the first base station BS1 generated by the user equipment 940a is greater than the threshold value, the control device 130 may group the RIS device 920a and the first base station BS1 into the first group Gp91. Since the signal measurement result associated with the first base station BS1 generated by the user equipment 940b is greater than the threshold value, the control device 130 may group the RIS device 920b and the first base station BS1 into the first group Gp91. That is, the first group Gp91 includes the first base station BS1, the RIS device 920a, and the RIS device 920b. Based on similar principles and operations, the control device 130 may group the second base station BS2, the RIS device 920c, and the RIS device 920d into a second group Gp92. Therefore, according to the description similar to FIG. 8A, the control device 130 may control the first group Gp91 and the second group Gp92 to operate in the non-cooperation mode.

Figure 9B:
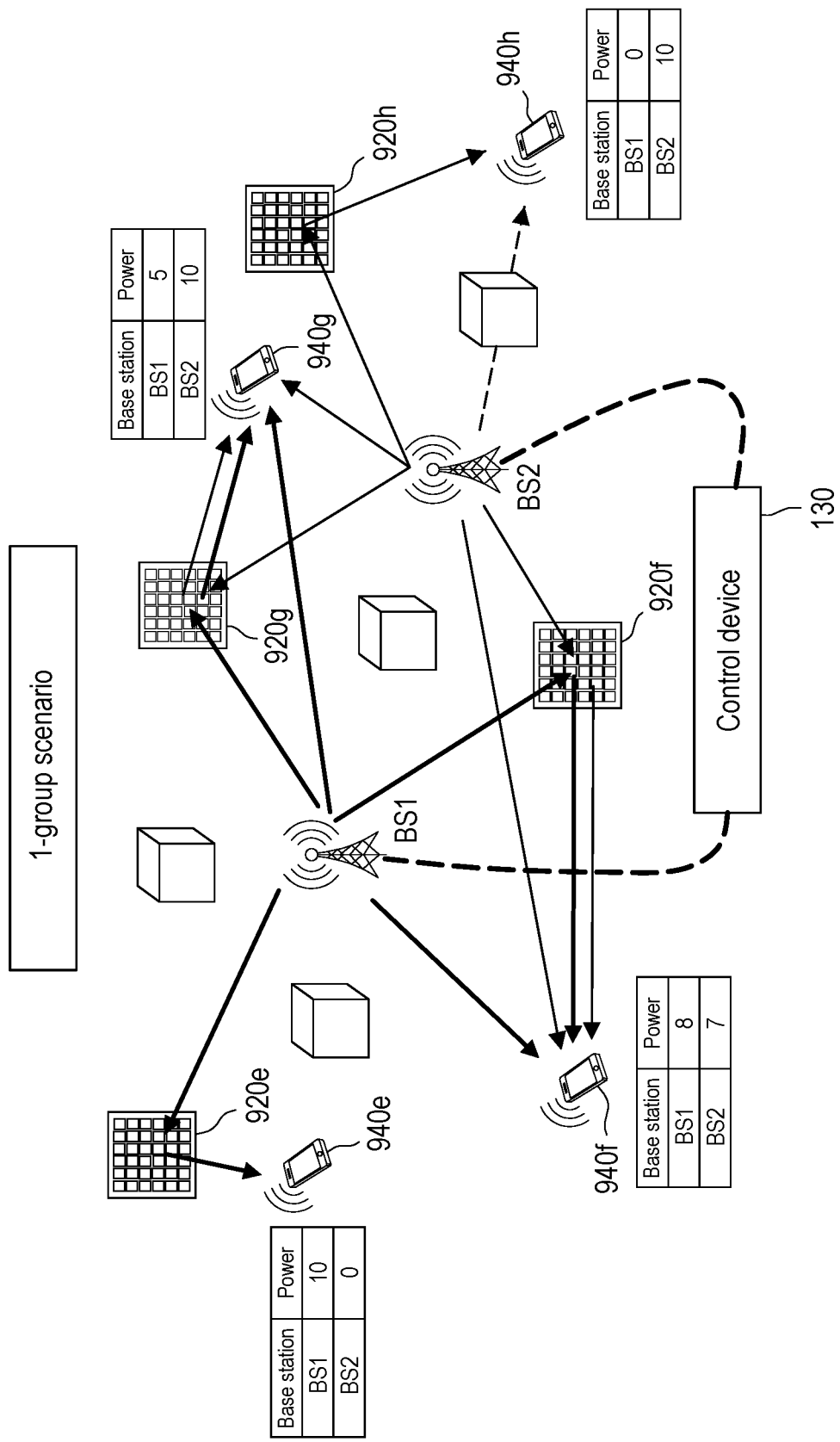
FIG. 9B is a schematic diagram illustrating a group operating in a cooperation mode according to an exemplary embodiment of the disclosure.

Referring to FIG. 9B, FIG. 9B is a schematic diagram illustrating a group operating in a cooperation mode according to an exemplary embodiment of the disclosure. All numerical values shown in FIG. 9B are for exemplary description only. Compared with the example shown in FIG. 8B, the example shown in FIG. 9B uses the user equipment 940e, 940f, 940g, and 940h to measure beams generated by the first base station BS1 and the second base station BS2. In particular, the user equipment 940e, 940f, 940g, and 940h may measure the reference signal reflected by the RIS device 920e, 920f, 920g, and 920h.

In FIG. 9B, since both the signal measurement result associated with the first base station BS1 and the signal measurement result associated with the second base station BS2 generated by the user equipment 940f are greater than the threshold value, the control device 130 may group the RIS device 920f, the first base station BS1, and the second base station BS2 into the same group. Similarly, the control device 130 may group the RIS device 920g, the first base station BS1, and the second base station BS2 into the same group.

In addition, since the signal measurement result associated with the first base station BS1 generated by the user equipment 940e is greater than the threshold value, the control device 130 may group the RIS device 920e and the first base station BS1 into the same group. Similarly, the control device 130 may group the RIS device 920h and the second base station BS2 into the same group. In this case, the first base station BS1, the second base station BS2, the RIS device 920e, the RIS device 920f, the RIS device 920g, and the RIS device 920h are all grouped into the same group by the control device 130. Therefore, according to the description similar to FIG. 8B, the control device 130 may control the first base station BS1 and the second base station BS2 in the same group to operate in the cooperation mode.

Figure 10:
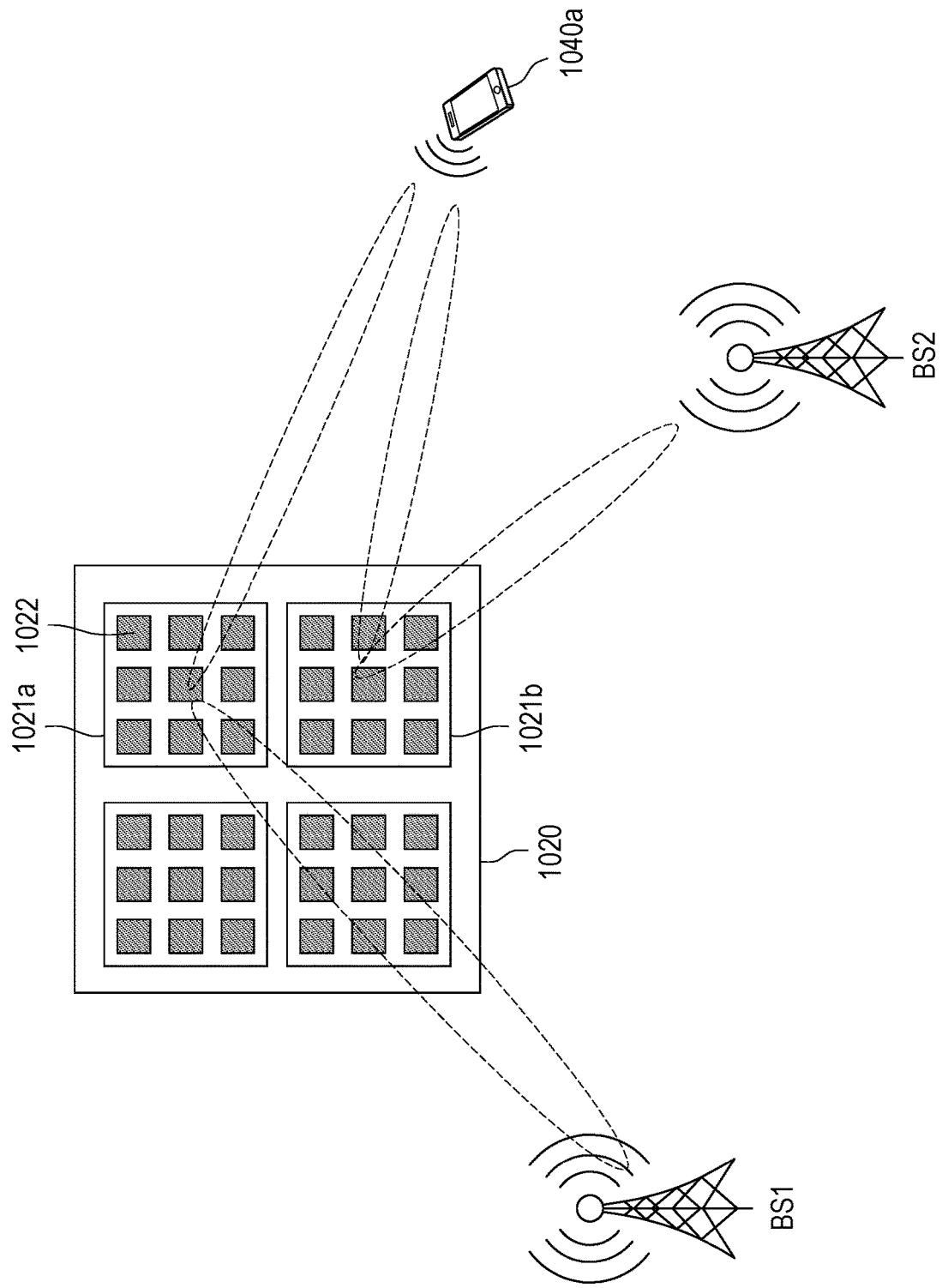
FIG. 10 is a schematic diagram illustrating a RIS device for reflecting signals according to an exemplary embodiment of the disclosure.

Referring to FIG. 10, FIG. 10 is a schematic diagram illustrating a RIS device for reflecting signals according to an exemplary embodiment of the disclosure. When the first base station BS1, the second base station BS2 and the RIS device 1020 operate in the cooperation mode, the RIS device 1020 may simultaneously reflect the beam of the first base station BS1 and the beam of the second base station BS2. For example, the RIS device 1020 may be the RIS device 820h or the RIS device 820f in FIG. 8B.

The RIS device 1020 may include multiple first reflection units (e.g., the reflection unit 1022) forming the first unit set 1021a and multiple second reflection units forming the second unit set 1021b. The multiple first reflection units of the first unit set 1021a are used to reflect the beam of the first base station BS1. The multiple second reflection units of the second unit set 1021b are used to reflect the beam of the second base station BS2. In this way, the user equipment 1040a may obtain the downlink data provided by the first base station BS1 and the second base station BS2 through the RIS device 1020. In some embodiments, the multiple first reflection units of the first unit set 1021a may be controlled according to the control information provided by the first base station BS1. The first base station BS1 may instruct the RIS device 1020 to reflect the incident beam of the first base station BS1 to the user equipment 1040a. The multiple second reflection units of the second unit set 1021b may be controlled according to the control information provided by the second base station BS2. The second base station BS2 may instruct the RIS device 1020 to reflect the incident beam of the second base station BS2 to the user equipment 1040a.

Figure 11:
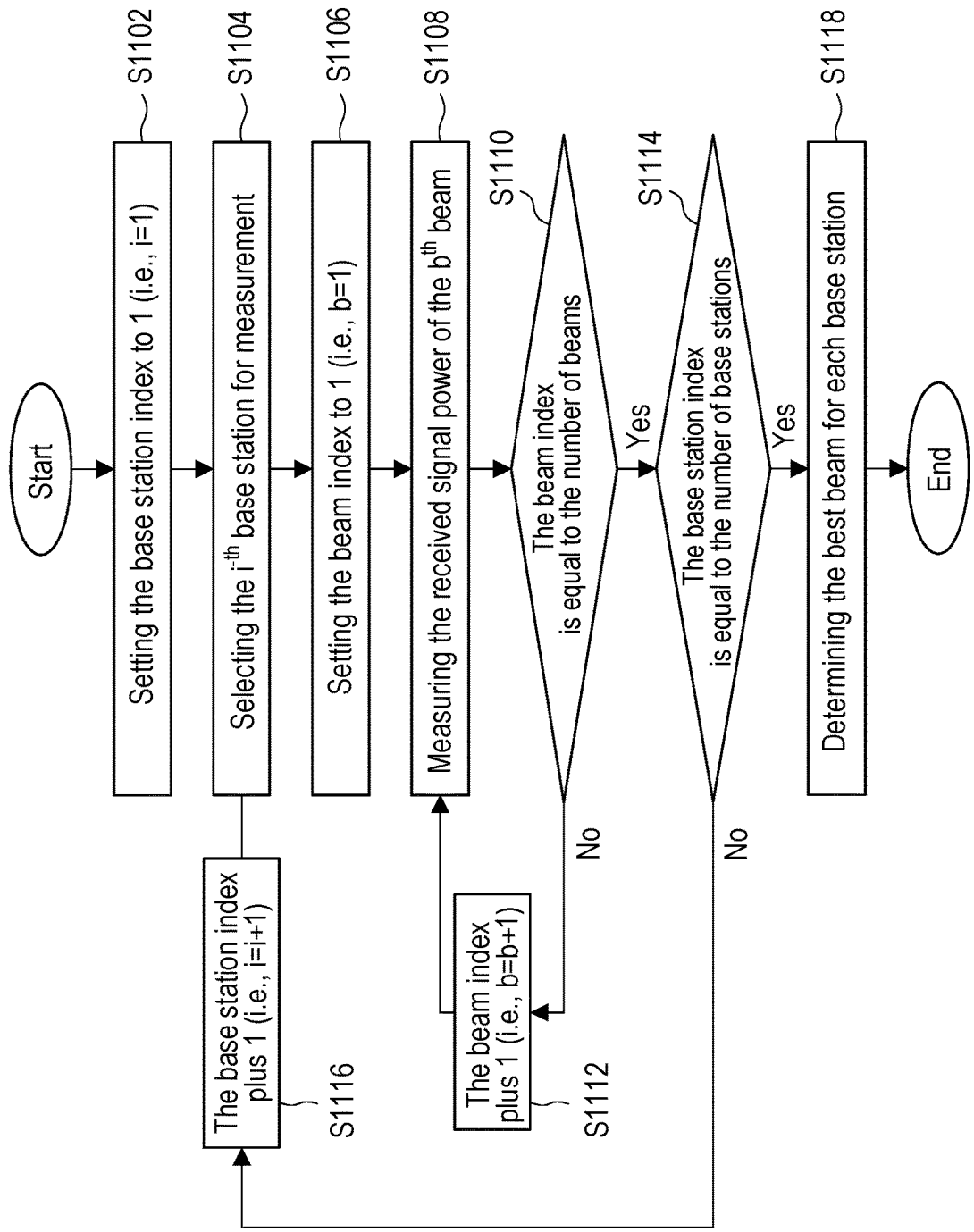
FIG. 11 is a flowchart of beam measurement according to an exemplary embodiment of the disclosure.

FIG. 11 is a flowchart of beam measurement according to an exemplary embodiment of the disclosure. The process shown in FIG. 11 may be executed by the RIS device 120 or the user equipment 140 shown in FIG. 1. For the convenience of description, the beam measurement performed by the RIS device 120 is taken as an example for description below. Referring to FIG. 11, in step S1102, the RIS device 120 sets the base station index to 1 (i.e., i=1). In step S1104, the RIS device 120 selects the $i^{th}$ base station for measurement. In step S1106, the RIS device 120 sets the beam index to 1 (i.e., b=1).

In step S1108, the RIS device 120 measures the received signal power of the $b^{th}$ beam. In step S1110, the RIS device 120 determines whether the beam index is equal to the number of beams. If the determination in step S1110 is no, proceed to step S1112, the RIS device 120 adds 1 to the beam index (i.e., b=b+1). After adding 1 to the beam index, return to step S1108 again. That is, step S1108 and step S1110 are repeated until the beam index is equal to the number of beams. That is, the RIS device 120 performs measurements on all beams of a certain base station 110. Afterwards, if the determination in step S1110 is yes, in step S1114, the RIS device 120 determines whether the base station index is equal to the number of base stations. If the determination in step S1114 is no, proceed to step S1116, the RIS device 120 adds 1 to the base station index (i.e., i=i+1). After adding 1 to the base station index, return to step S1104 again. That is, the RIS device 120 performs beam measurement for each base station 110.

Finally, if the determination in step S1114 is yes, in step S1118, the RIS device 120 determines the best beam for each base station 110. Therefore, the RIS device 120 may obtain the signal measurement results of each base station 110 according to the best beam of each base station 110, so that the control device 130 may perform grouping operations according to the signal measurement results of each base station 110.

Figure 12:
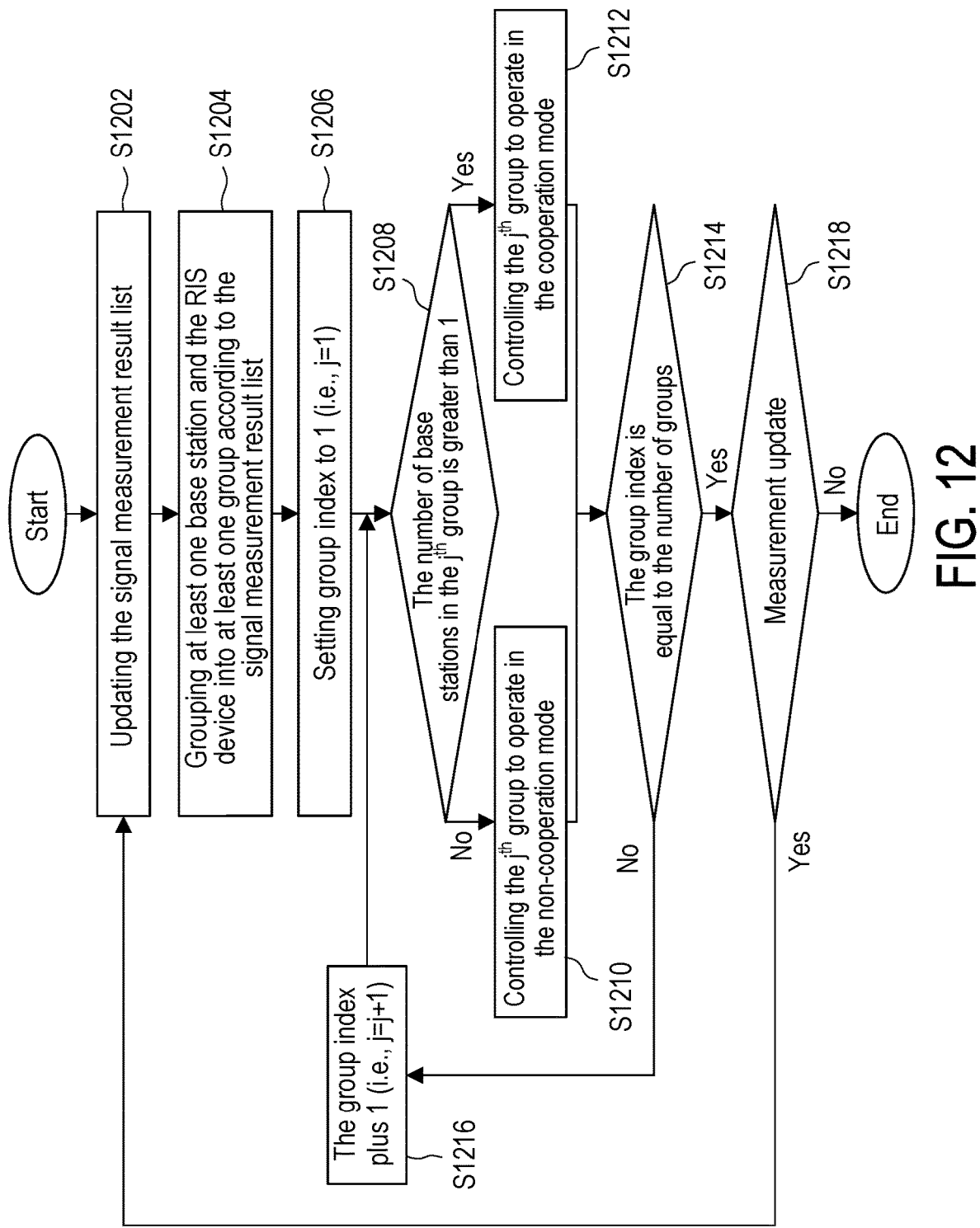
FIG. 12 is a flowchart of grouping and mode control according to an exemplary embodiment of the disclosure.

FIG. 12 is a flowchart of grouping and mode control according to an exemplary embodiment of the disclosure. The process shown in FIG. 12 may be executed by the control device 130 shown in FIG. 1. In step S1202, the control device 130 updates the signal measurement result list. In some embodiments, in response to the RIS device 120 updating the measurement result, the control device 130 updates the signal measurement result list provided by one or more RIS devices 120. The signal measurement result list provided by each RIS device 120 may include signal measurement results of one or more base stations. In step S1204, the control device 130 groups at least one base station 110 and the RIS device 120 into at least one group according to the signal measurement result list provided by each RIS device 120. The control device 130 may group the base station 110 and the RIS device 120 into G groups, where G is an integer greater than or equal to 1.

In step S1206, the control device 130 sets the group index to 1 (i.e., j=1). In step S1208, the control device 130 determines whether the number of base stations in the $j^{th}$ group is greater than 1. If the determination in step S1208 is no, in step S1210, the control device 130 controls the $j^{th}$ group to operate in a non-cooperation mode. If the determination in step S1208 is yes, in step S1212, the control device 130 controls the $j^{th}$ group to operate in a cooperation mode.

Afterwards, in step S1214, the control device 130 determines whether the group index is equal to the number of groups, that is, the control device 130 determines whether j is equal to G. If the determination in step S1214 is no, proceed to step S1216, the control device 130 adds 1 to the group index (i.e., j=j+1). After the group index is incremented by 1, return to step S1208 to determine whether the transmission mode of each group is the cooperation mode or the non-cooperation mode one by one. If the determination in step S1214 is yes, in step S1218, the control device 130 determines whether the measurement is updated. If the determination in step S1218 is yes, return to step S1202, and the control device 130 performs the grouping operation again and determines the transmission mode of each group.

To sum up, in the embodiments of the disclosure, RIS devices and base stations may be grouped into one or more groups according to the actual channel state, so that they may respond to channel changes to adaptively adjust the RIS grouping configuration meeting the current channel state. In addition, since the transmission mode of the base station may be configured according to the grouping result, the communication system disclosed in this disclosure may control the switching operation of the base station in the cooperation mode or the non-cooperation mode in response to channel changes, which not only greatly improves the flexibility of the communication system, but also effectively optimize system transmission performance.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A communication system using a reconfigurable intelligent surface (RIS), comprising:
    at least one base station, respectively transmitting at least one beam;
    an RIS device, coupled to the at least one base station and measuring the at least one beam of the at least one base station to obtain signal measurement results associated with each of the at least one base station; and
    a control device, coupled to the at least one base station and grouping the at least one base station and the RIS device into at least one group according to the signal measurement results associated with each of the at least one base station,
    wherein the at least one group comprises a first group, and the control device controls the first group to operate in a cooperation mode or a non-cooperation mode according to a number of base stations in the first group.

2. The communication system using the reconfigurable intelligent surface according to claim 1, wherein when the number of base stations in the first group is greater than 1, the control device controls the first group to operate in the cooperation mode; and when the number of base stations in the first group is equal to 1, the control device controls the first group to operate in the non-cooperation mode.

3. The communication system using the reconfigurable intelligent surface according to claim 1, wherein when the first group operates in the cooperation mode, the control device controls a first base station and a second base station in the first group to jointly transmit downlink data to user equipment.

4. The communication system using the reconfigurable intelligent surface according to claim 3, wherein the RIS device comprises a plurality of first reflection units and a plurality of second reflection units, the first reflection units are used to reflect a beam of the first base station, and the second reflection units are used to reflect a beam of the second base station.

5. The communication system using the reconfigurable intelligent surface according to claim 1, wherein the signal measurement results comprise received signal strength indicator (RSSI), reference signal received power (RSRP), reference signal received quality (RSRQ), or other signal strength indicators.

6. The communication system using the reconfigurable intelligent surface according to claim 1, wherein the at least one base station comprises a first base station, the RIS device measures the at least one beam of the first base station to obtain signal measurement parameters of each of the at least one beam of the first base station, and the RIS device determines signal measurement result associated with the first base station according to the signal measurement parameters of each of the at least one beam of the first base station.

7. The communication system using the reconfigurable intelligent surface according to claim 1, wherein the at least one base station comprises a first base station, and in response to signal measurement result of the first base station being greater than a threshold value, the control device groups the RIS device and the first base station into one of the at least one group.

8. The communication system using the reconfigurable intelligent surface according to claim 7, wherein the at least one base station comprises a second base station, and in response to the signal measurement result of the first base station being greater than the threshold value and signal measurement result of the second base station being greater than the threshold value, the control device groups the RIS device, the first base station, and the second base station into one of the at least one group.

9. A communication method using a reconfigurable intelligent surface, comprising:
    measuring at least one beam of at least one base station to obtain signal measurement results associated with each of the at least one base station;
    grouping the at least one base station and an RIS device into at least one group according to the signal measurement results associated with each of the at least one base station, wherein the at least one group comprises a first group; and controlling the first group to operate in a cooperation mode or a non-cooperation mode according to a number of base stations in the first group.

10. The communication method using the reconfigurable intelligent surface according to claim 9, wherein measuring the at least one beam of the at least one base station to obtain the signal measurement results associated with each of the at least one base station comprises:
    measuring the at least one beam of the at least one base station to obtain the signal measurement results associated with each of the at least one base station via the RIS device.

11. The communication method using the reconfigurable intelligent surface according to claim 9, wherein measuring the at least one beam of the at least one base station to obtain the signal measurement results associated with each of the at least one base station comprises:
    measuring the at least one beam of the at least one base station to obtain the signal measurement results associated with each of the at least one base station via a user equipment.

12. The communication method using the reconfigurable intelligent surface according to claim 9, wherein the method further comprises:
    controlling the first group to operate in the cooperation mode when the number of base stations in the first group is greater than 1; and
    controlling the first group to operate in the non-cooperation mode when the number of base stations in the first group is equal to 1.

13. The communication method using the reconfigurable intelligent surface according to claim 12, wherein controlling the first group to operate in the cooperation mode when the number of base stations in the first group is greater than 1 comprises:
    controlling a first base station and a second base station in the first group to jointly transmit downlink data to user equipment when the first group operates in the cooperation mode.

14. The communication method using the reconfigurable intelligent surface according to claim 13, wherein controlling the first base station and the second base station in the first group to jointly transmit the downlink data to the user equipment comprises:
    reflecting a beam of the first base station through a plurality of first reflection units of the RIS device; and
    reflecting a beam of the second base station through a plurality of second reflection units of the RIS device.

15. The communication method using the reconfigurable intelligent surface according to claim 9, wherein the signal measurement results comprise received signal strength indicator, reference signal received power, reference signal received quality, or other signal strength indicators.

16. The communication method using the reconfigurable intelligent surface according to claim 9, wherein the at least one base station comprises a first base station, and measuring the at least one beam of the at least one base station to obtain the signal measurement results associated with each of the at least one base station comprises:
    measuring the at least one beam of the first base station to obtain signal measurement parameters of each of the at least one beam of the first base station; and
    determining signal measurement result associated with the first base station according to the signal measurement parameters of each of the at least one beam of the first base station.

17. The communication method using the reconfigurable intelligent surface according to claim 9, wherein the at least one base station comprises a first base station, and grouping the at least one base station and the RIS device into the at least one group according to the signal measurement results associated with each of the at least one base station comprises:
    in response to signal measurement result of the first base station being greater than a threshold value, grouping the RIS device and the first base station into one of the at least one group.

18. The communication method using the reconfigurable intelligent surface according to claim 17, wherein the at least one base station comprises a second base station, and grouping the at least one base station and the RIS device into the at least one group according to the signal measurement results associated with each of the at least one base station comprises:
    in response to the signal measurement result of the first base station being greater than the threshold value and signal measurement result of the second base station being greater than the threshold value, grouping the RIS device, the first base station, and the second base station into one of the at least one group.

19. A reconfigurable intelligent surface device, comprising:
    a transceiver;
    a memory; and
    a processor, coupled to the transceiver and the memory, configured to:
    measure at least one beam of at least one base station obtain signal measurement results associated with each of the at least one base station; and
    transmit the signal measurement results associated with each of the at least one base station to a control device through the transceiver, wherein the signal measurement results of each of the at least one base station are used to determine a group to which the reconfigurable intelligent surface device belongs, and the group is configured to operate in a cooperation mode or a non-cooperation mode according to a number of base stations in the group.

* * * * *